(12) United States Patent
Erickson

(10) Patent No.: US 9,914,165 B2
(45) Date of Patent: Mar. 13, 2018

(54) COLLAR DELIVERY SYSTEMS FOR SWAGE GUNS

(71) Applicant: The Boeing Company, Chicago, IL (US)

(72) Inventor: Chris J. Erickson, Garden Grove, CA (US)

(73) Assignee: THE BOEING COMPANY, Chicago, IL (US)

(*) Notice: Subject to any disclaimer, the term of this patent is extended or adjusted under 35 U.S.C. 154(b) by 206 days.

(21) Appl. No.: 14/839,116

(22) Filed: Aug. 28, 2015

(65) Prior Publication Data

US 2017/0056958 A1 Mar. 2, 2017

(51) Int. Cl.
*B21J 15/02* (2006.01)
*B21J 15/32* (2006.01)
*B23P 19/00* (2006.01)

(52) U.S. Cl.
CPC .............. *B21J 15/022* (2013.01); *B21J 15/32* (2013.01); *B21J 15/326* (2013.01); *B23P 19/006* (2013.01)

(58) Field of Classification Search
CPC ..... B23P 19/001; B23P 19/002; B23P 19/026; B21J 15/022; B21J 15/025; B21J 15/12; B21J 15/326; B21J 15/32
See application file for complete search history.

(56) References Cited

U.S. PATENT DOCUMENTS

| | | | | |
|---|---|---|---|---|
| 5,733,089 | A * | 3/1998 | Albright | B21J 15/32 221/310 |
| 8,819,907 | B2 * | 9/2014 | Tomchick | B21D 43/00 29/243.517 |
| 2004/0194283 | A1 * | 10/2004 | Bloch | B21J 15/32 29/525.01 |
| 2013/0255053 | A1 | 10/2013 | Erickson | |

FOREIGN PATENT DOCUMENTS

| EP | 0968794 A2 * | 5/2000 | B25B 23/10 |
|---|---|---|---|
| WO | WO 2012/055830 A1 * | 3/2012 | B23K 9/206 |

\* cited by examiner

*Primary Examiner* — Christopher Besler
(74) *Attorney, Agent, or Firm* — Duft Bornsen & Fettig LLP

(57) ABSTRACT

Systems and methods are provided for delivering collars to swage guns for swaging. One embodiment is an apparatus that includes a frame, arms movably attached to the frame, a tensioner mechanism that applies force to drive the arms towards each other, and fingers that each extend from an arm. The fingers each include a lengthwise structure. The lengthwise structure includes an arcuate portion dimensioned to mate with an arcuate portion of another finger to form a hollow cylindrical receptacle. The lengthwise structure also includes a channel extending to the arcuate portion, dimensioned to mate with a channel of another finger to form a hollow tunnel for delivering a collar to the receptacle when the fingers are partially apart from each other. The arms of the apparatus each include a contact area.

15 Claims, 22 Drawing Sheets

US 9,914,165 B2

COLLAR DELIVERY SYSTEMS FOR SWAGE GUNS

FIELD

The disclosure relates to the field of tools, and in particular, to swaging tools.

BACKGROUND

Swaging tools, also known as "swage guns," utilize intense amounts of pressure to materially deform the objects that they work upon in order to achieve a mechanical goal. For example, a swage gun may be used to compress a collar onto a fastener for an aircraft, such as a fastener that attaches a spar cap to the skin of an aircraft wing. While swaging tools may be useful for facilitating mechanical fastening techniques, many swaging tools are bulky and large. When swaging tools take up a great deal of space, it becomes hard, if not impossible, to perform swaging in low profile areas. This is undesirable because it limits the number of locations that swaging is performed on a manufactured product.

SUMMARY

Embodiments described herein provide for enhanced collar delivery systems for swage guns. The collar delivery systems dynamically detach, reattach, and/or reposition portions of a track that delivers collars to the swage gun. Since the track portions are mobile, the track does not interfere with the swage gun while the swage gun is actively working on a fastener. This in turn reduces the profile of the swage gun while operating, ensuring that the swage gun is capable of reaching areas that were previously inaccessible.

One embodiment is a collar delivery apparatus for a swage gun, the apparatus including a frame, arms rotatably attached to the frame, and a tensioner mechanism that applies force to drive the arms towards each other. The apparatus also includes fingers that each extend from an arm, and that each include a lengthwise structure. The lengthwise structure includes an arcuate portion dimensioned to mate with an arcuate portion of another finger to form a hollow cylindrical receptacle. The lengthwise structure also includes a channel extending from a receiving end of the finger to the arcuate portion, dimensioned to mate with a channel of another finger to form a hollow tunnel. The arms each further include a contact area contacting a deflector attached to the swage gun.

Another embodiment is a method for operating a swaging system. The method includes aligning a swage gun beneath a fastener, positioning fingers above the swage gun and beneath the fastener, mating a channel of a first finger with a channel of a second finger and retaining the fingers in contact. The method also includes driving the swage gun upward toward the fastener, deflecting the fingers apart from each other and away from the swage gun, and swaging the collar onto the fastener.

Another embodiment is an apparatus that includes fingers extending above a swage gun that are in contact with each other and define a receptacle dimensioned to hold a collar for a fastener. When the fingers are partially apart from being each other, the fingers define a tunnel dimensioned to transport the collar to the receptacle. The apparatus also includes a carriage that detachably engages with the fingers. The carriage includes wedges that contact receiving ends of the fingers and spread the fingers partially apart, and a loading track for delivering a collar to the tunnel.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
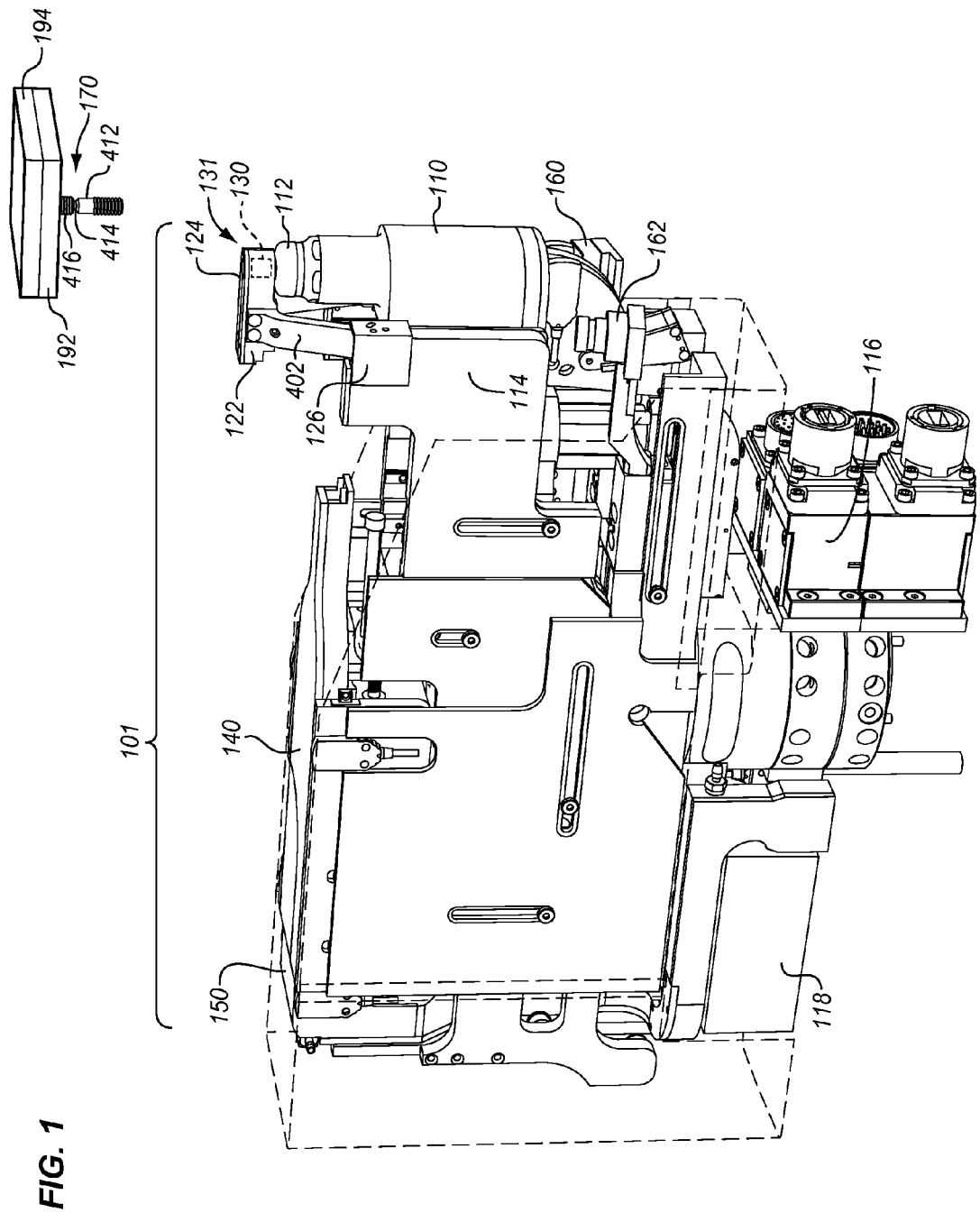
FIG. 1 is a perspective view of a swaging system that is loaded with a collar in an exemplary embodiment.

FIG. 1 is a perspective view of a swaging system 100 that is loaded with a collar 130 in an exemplary embodiment. Swaging system 100 comprises any system, device, or component operable to swage collars onto fasteners. Swaging system 100 includes a mobile collar delivery system with components that are capable of dynamically moving themselves during operation in order to load collars for swaging onto fasteners. This reduces the overall bulk and profile of the collar delivery system, enhancing the ability of swaging system 100 to be used in constricted or tight spaces.

In this embodiment, swaging system 100 comprises frame 114. Frame 114 holds/supports elements of swaging system 100 such as swage gun 110, which is slidably attached to frame 114. Swaging system 100 also comprises a collar delivery system 101 that includes fingers 122 and 124, carriage 140, and feeder 150. Collars 130 travel from feeder 150 into carriage 140. Carriage 140 stores a collar 130, and is capable of being physically detached from feeder 150 to engage with fingers 122 and 124. Carriage 140 then delivers a collar 130 to a receptacle 131 between fingers 122 and 124. The fingers 122-124 are mounted to arms (e.g., arm 402), and are held in contact with each other by tensioners 126 (e.g., torsion springs) on either side of frame 114, ensuring that the fingers 122-124 do not drop a collar 130 from the receptacle 131. Swage gun 110 secures a fastener 170 by affixing a collar 130 via swaging. Swage gun 110 an anvil 112 for pressing/deforming a collar 130 onto fastener 170. Swage gun 110 operates upon fastener 170, which is used to attach aircraft wing skin 194 to spar cap 192. However, as discussed above the implementations discussed herein are only examples, and swage gun 110 may operate upon any suitable fastener performing any suitable fastening role. In this embodiment, fastener 170 comprises a HI-LOK™ brand threaded fastener, manufactured by LISI Aerospace, that operates as a hybrid rivet/bolt.

Further elements of swaging system 100 include cameras 160 and 162, which provide visual input for aligning swaging system 100 with fastener 170, and a pintail vacuum system 180 that is adapted to discard a pintail 412 that has been snapped off of a base 416 of fastener 170 at neck 414.

Figure 12:
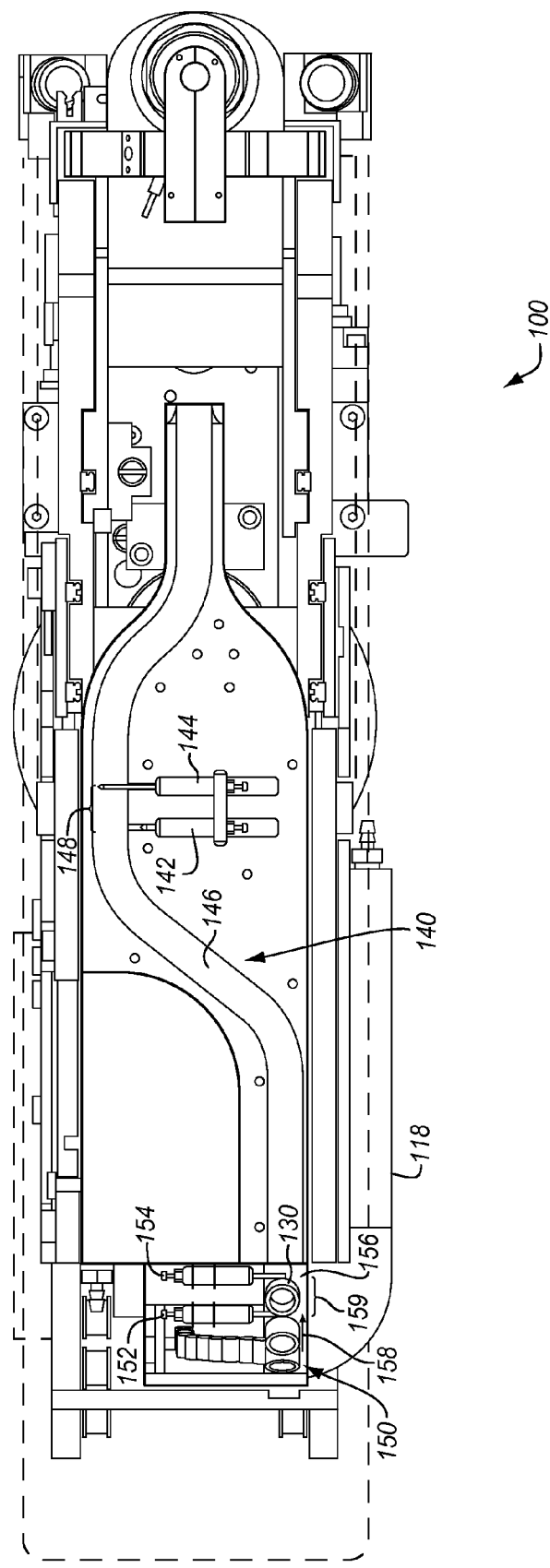
FIGS. 12-20 are perspective and top views of a swaging system actively loading a new collar in an exemplary embodiment.

Each portion of swaging system 100 may be actuated by air pistons (e.g., two-position air pistons, as shown at FIG. 12, at 152, 154, 142, 144) attached by hoses (not shown) to an air logic controller 118. Controller 118, based on input from sensors located throughout swaging system 100, may drive the application of air pressure via the hoses to the pistons (e.g., FIG. 12, at 152, 154, 142, 144) in order to move swaging system 100 and/or stage the motion of a collar 130. For example, in this embodiment controller 118 uses input from break-beam laser sensor 116 to detect whether vacuum system 180 is functioning properly to remove pintail 412 from swage gun 110. Controller 118 may be implemented as custom circuitry, a processor executing programmed instructions, or some combination thereof.

Illustrative details of the operation of swaging system 100 will be discussed with regard to the following FIGS. Specifically, FIGS. 2-11 illustrate swaging operations, and FIGS. 12-20 illustrate collar reloading operations that are performed in between swaging operations. Assume, for this embodiment, that fingers 122 and 124 retain collar 130 in a receptacle 131 which is formed by the fingers (122, 124) when they are touching. Further, assume that cameras 160 and 162 have imaged fastener 170 in order to determine a three dimensional (3D) location of fastener 170, as well as an orientation of fastener 170.

Figure 2:
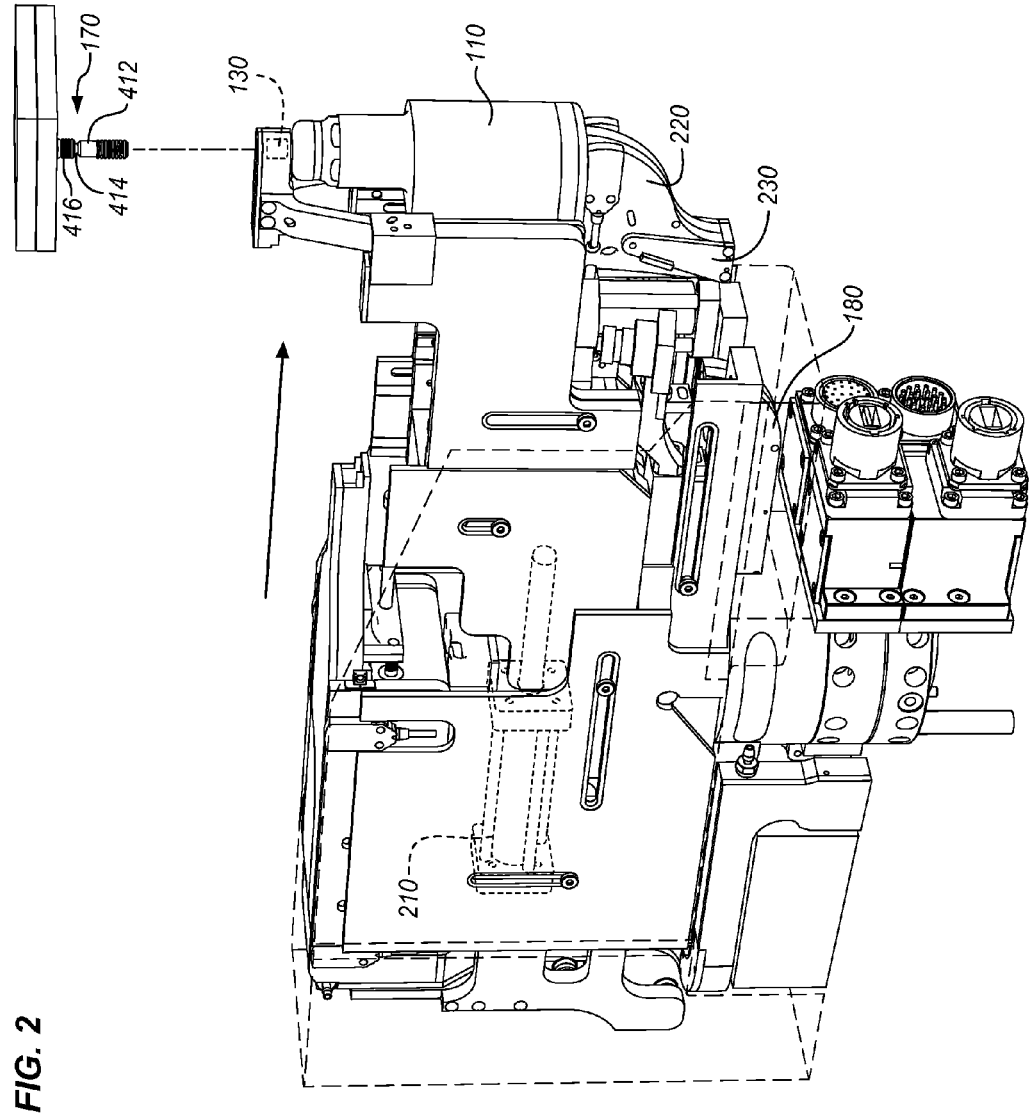
FIGS. 2-9 are perspective views of a swaging system swaging a collar onto a fastener in an exemplary embodiment.
Figure 3:
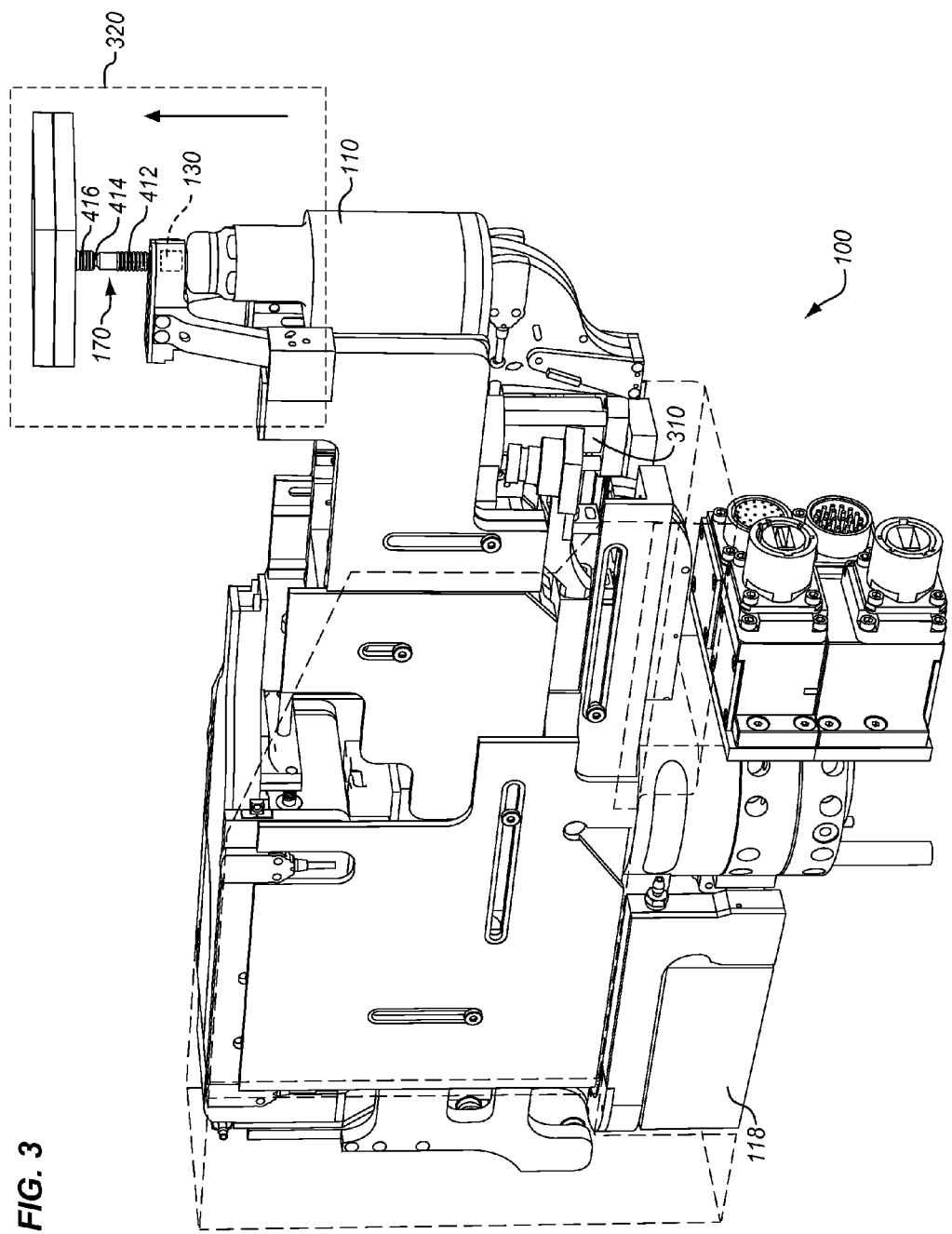

In FIG. 2, pistons (e.g., air piston 210) are driven by controller 118 outward to laterally move swage gun 110 towards fastener 170. This action disconnects return hose 220 from pintail vacuum system 180. To prevent pintail 412 from falling out of hose 220 during swaging, spring latch 230 engages/springs shut, thereby acting as an end cap for a distal portion of hose 220. Spring latch 230 is forced open when swage gun 110 returns to the position shown in FIG. 1. Thus, when swage gun 110 returns to its original position, spring latch 230 no longer caps hose 220, enabling pintail 412 to move from hose 220 into pintail vacuum system 180. In FIG. 3, controller 118 aligns swaging system 100 with fastener 170, to drive swaging system 100 vertically towards fastener 170. Meanwhile, piston 310 waits to displace swage gun 110 vertically upwards from the rest of swaging system 100. Region 320 will be further illustrated with respect to FIGS. 4-9.

Figure 4:
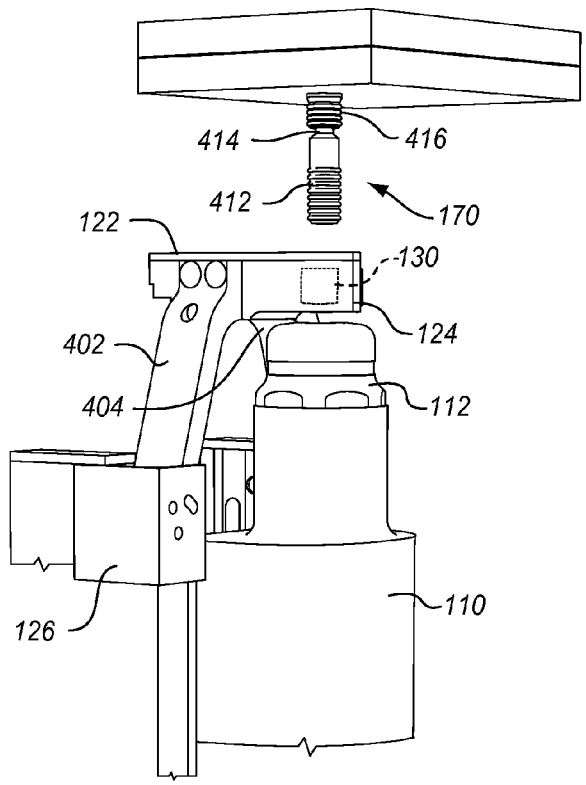

FIGS. 4-9 are zoomed in perspective views of swaging system 100 as it swages collar 130 onto fastener 170. FIG. 4 is a zoomed in view of region 320 of FIG. 3. According to FIG. 4, fingers 122 and 124 are pressed together to form a cylindrical receptacle 131 in which collar 130 is retained. Fingers 122 and 124 are held in place by arms 402 and 404, which each rotate about a pivot axis (2302, 2304 of FIG. 23) proximate to a tensioner 126. FIG. 4 further illustrates that fastener 170 comprises pintail 412, neck 414, and base 416. When swaging is performed on fastener 170 by swage gun 110, swage gun 110 will break fastener 170 at neck 414, causing pintail 412 to drop into swage gun 110, leaving base 416 behind.

Figure 5:
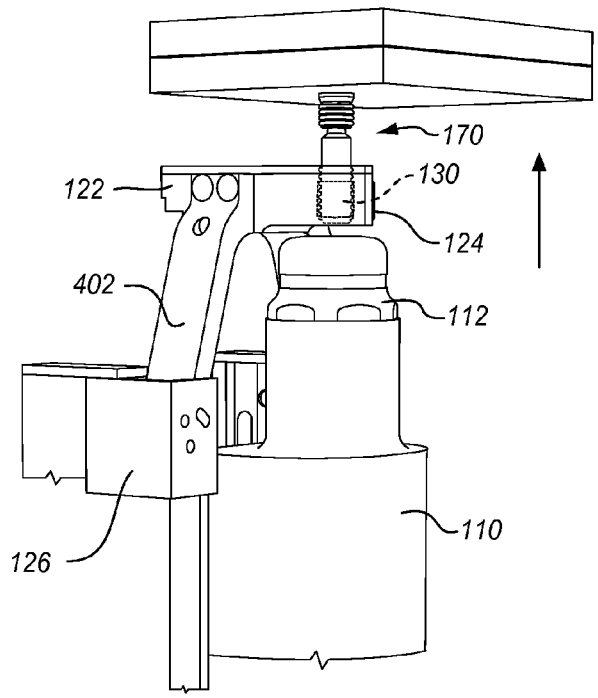
Figure 6:
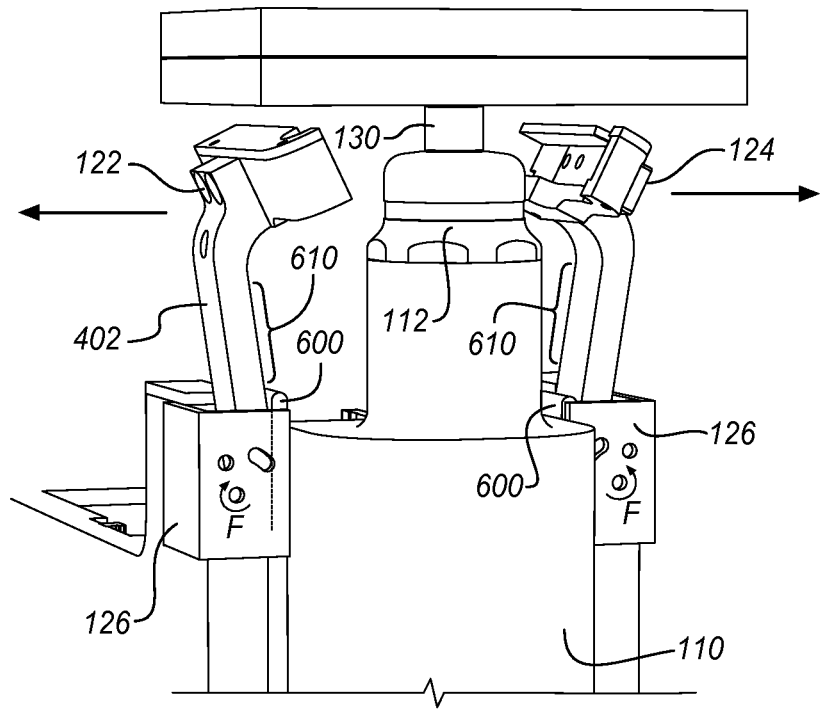
Figure 7:
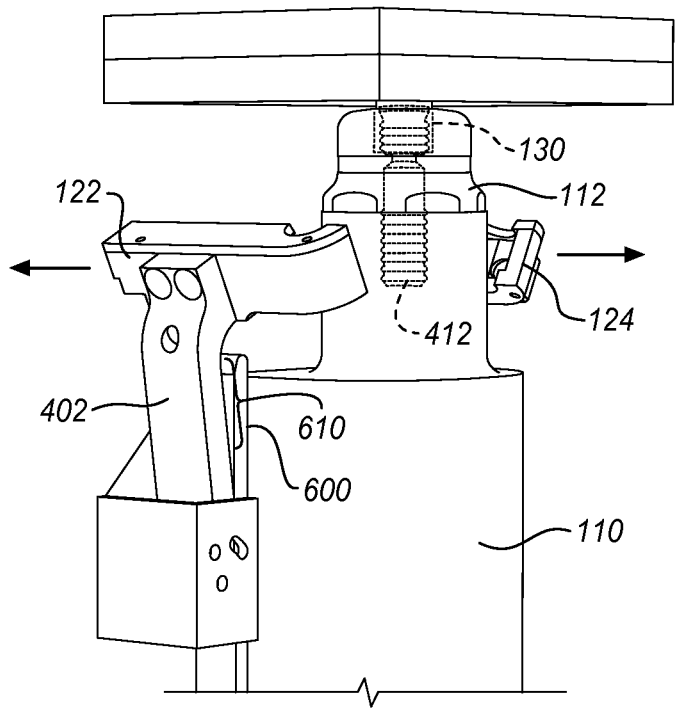

In FIG. 5, controller 118 presses collar 130 upward and through fastener 170. In FIG. 6, piston 310 (FIG. 3) activates to drive swage gun 110 upwards separately from the rest of swaging system 100. A deflector 600, attached to swage gun 110, presses against contact areas 610 on arms 402 and 404, overcoming forces (F) applied by tensioners 126 on either side of swage gun 110. This action forces fingers 122 and 124 apart. In this embodiment, such a process is possible because fingers 122 and 124 are held together only by the forces (F) applied by tensioners 126, and are not physically interlocked with each other. Deflector 600 may be attached to or slidably coupled to frame 114 for swage gun 110, and may comprise a protrusion or prong dimensioned to slide against the contact areas 610 of arms 402 and 404. In FIG. 7, swage gun 110 grips fastener 170 and drives itself further upward, meaning that deflector 600 continues to spread fingers 122 and 124 by deflecting arms (e.g., arm 402) at contact areas 610. Swage gun 110 then drives anvil 112 upward and over collar 130, deforming/swaging collar 130 in place.

Figure 8:
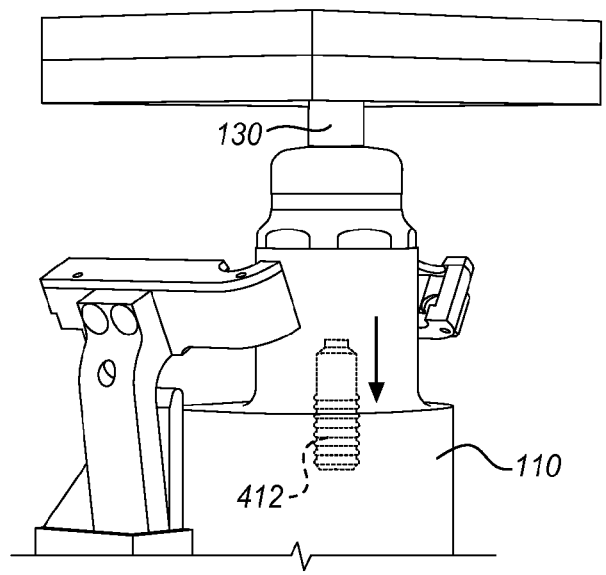
Figure 9:
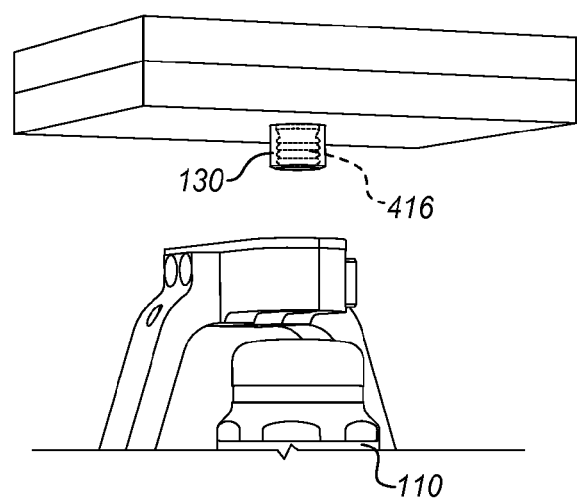
Figure 10:
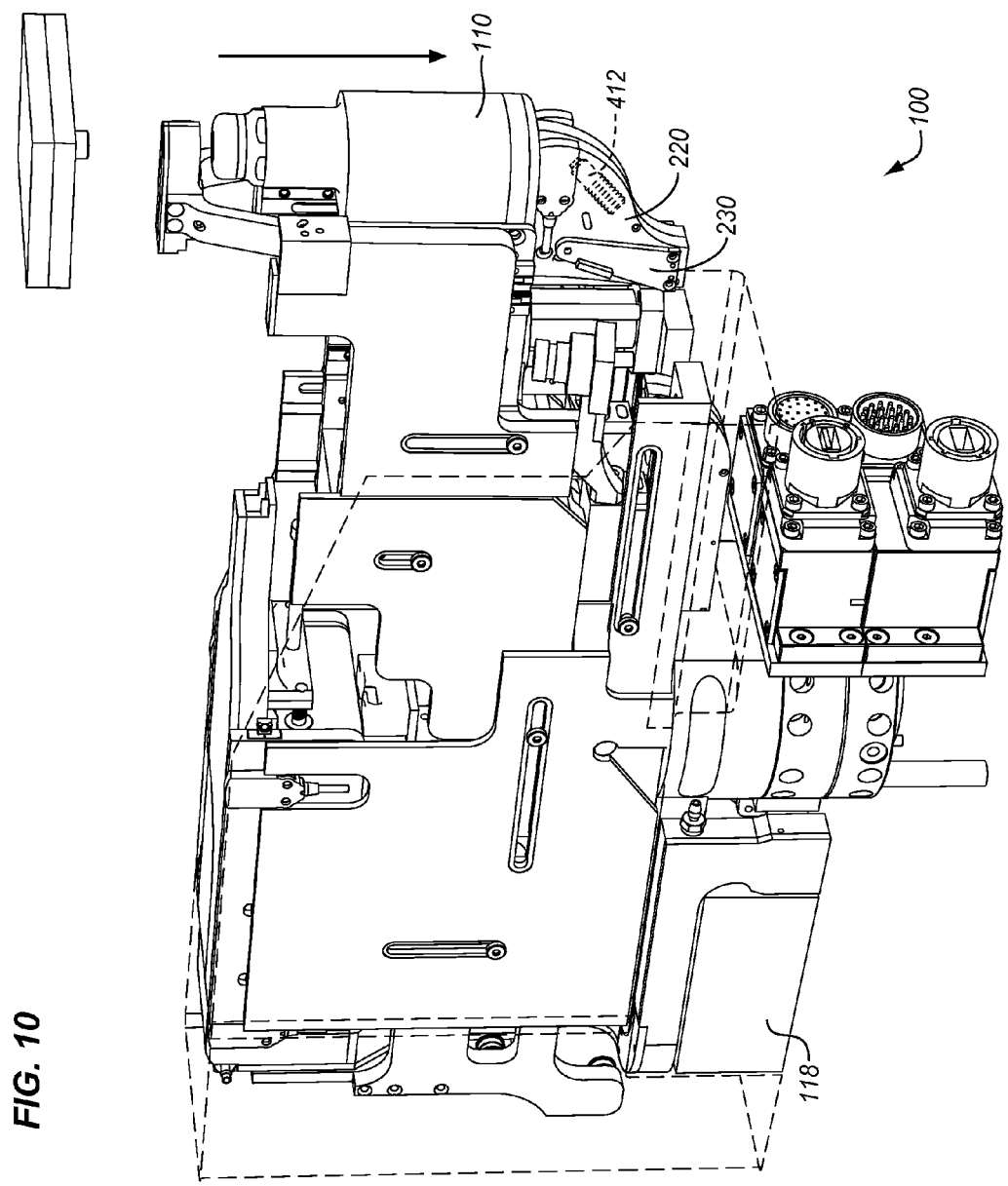
FIGS. 10-11 are perspective views of a swaging system that is retracting after swaging a collar to a fastener in an exemplary embodiment.
Figure 11:
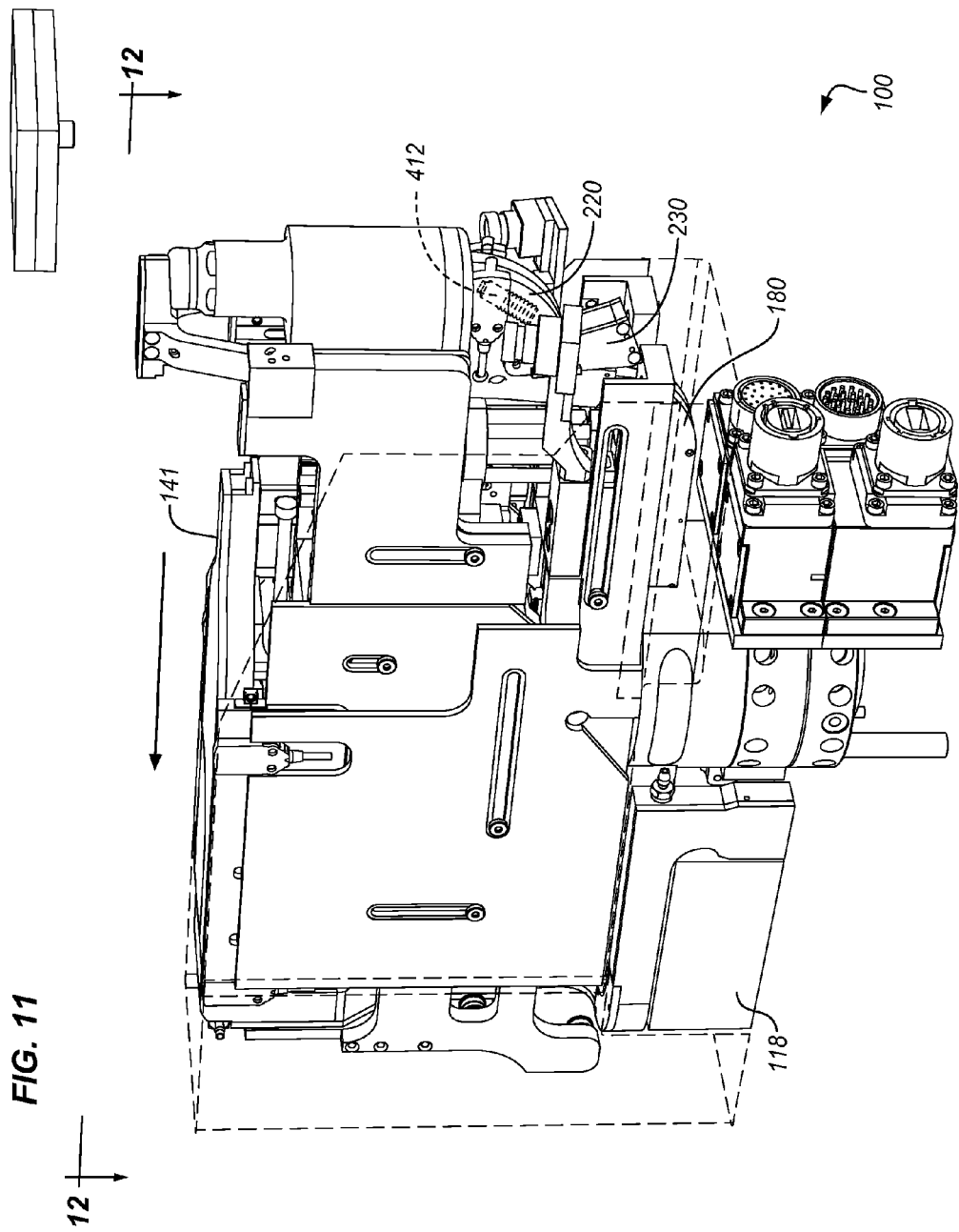

During swaging, anvil 112 applies hydraulic pressure to deform/flow collar 130 over base 416, locking base 416 in place. In this embodiment, the act of swaging collar 130 onto base 416 involves applying approximately 3000 pounds per square inch (PSI) of hydraulic pressure, permanently deforming collar 130. During this process, internal components of swage gun 110 (not shown) grip pintail 412, and snap pintail 412 off of fastener 170. In FIG. 8, swage gun 110 disengages from collar 130 as pintail 412 drops into swage gun 110. The process of disengaging swage gun 110 may itself involve applying 1500 PSI of hydraulic pressure. In FIG. 9, swage gun 110 lowers as piston 310 (FIG. 3) retracts, leaving collar 130 in place molded over base 416. FIG. 9 also shows that pintail 412 has dropped into hose 220 from swage gun 110, but is retained in position by spring latch 230. Controller 118 also lowers swaging system 100 back into its original position as shown in FIG. 10. Then, controller 118 laterally retracts swage gun 110 as shown in FIG. 11. In FIG. 11, spring latch 230 is sprung open by retracting swage gun 110, causing pintail 412 to get drawn from hose 220 into pintail vacuum system 180 and removed. FIG. 11 further illustrates a ceiling 141 of carriage 140, which is transparent.

At this point in time, a collar 130 has been successfully swaged onto fastener 170, meaning that fingers 122 and 124 are presently empty, and do not yet hold another collar 130 for swaging. Hence, swaging system 100 awaits reloading before it continues the swaging process for other fasteners 170. FIGS. 12-20 illustrate swaging system 100 actively loading a new collar 130 into the fingers 122 and 124 in an exemplary embodiment. These views of swaging system 100 illustrate carriage 140 dynamically coupling and decoupling with (e.g., by pressing against) feeder 150 and fingers 122 and 124).

FIG. 12 is a top view of swaging system 100, shown in FIG. 11 by the numeral 12, that illustrates feeder 150, which comprises a track 156, multiple collars 130, and two pistons 152 and 154, which are air-pressure driven and are managed by controller 118 based on sensor input in order to form a "gate" 159 that prevents more than one collar 130 from entering carriage 140 at a time. Gate 159 further prevents collars 130 from moving out of feeder 150 while carriage 140 is absent. Controller 118 may further drive airflow 158 via pressure along track 156 in order to drive collars 130 along track 156.

Figure 13:
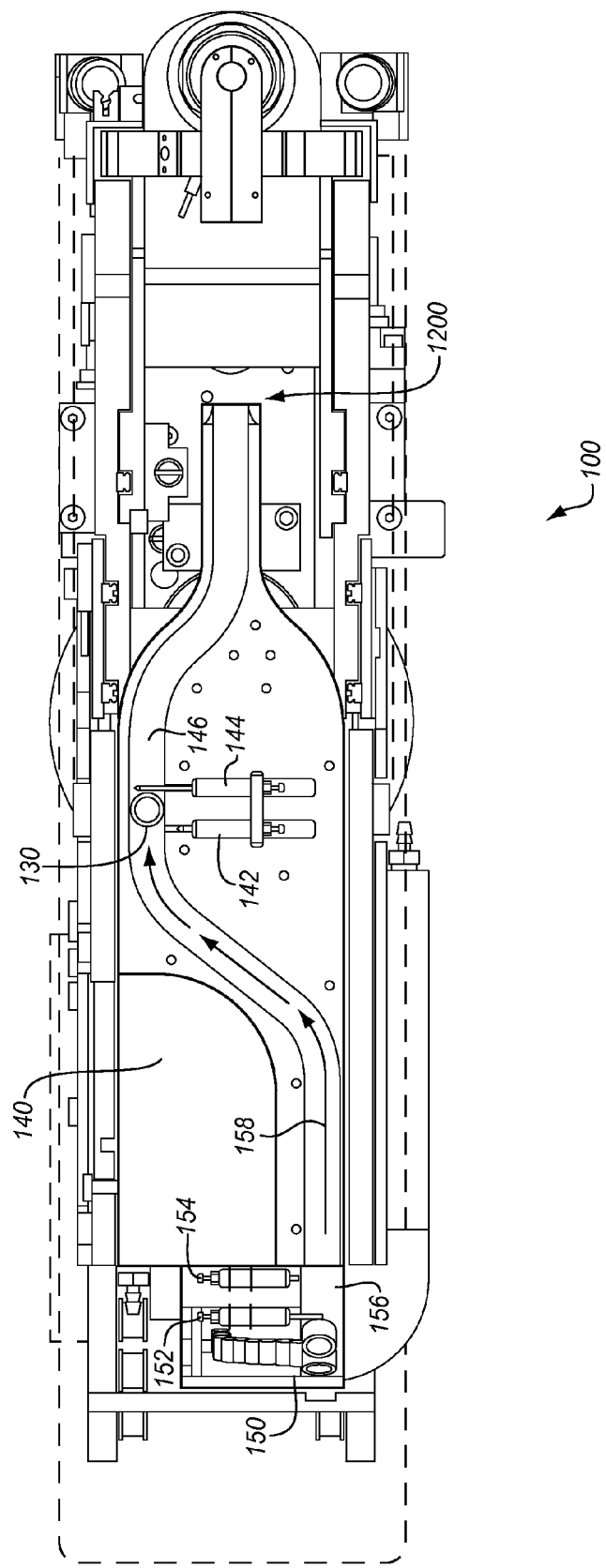
Figure 14:
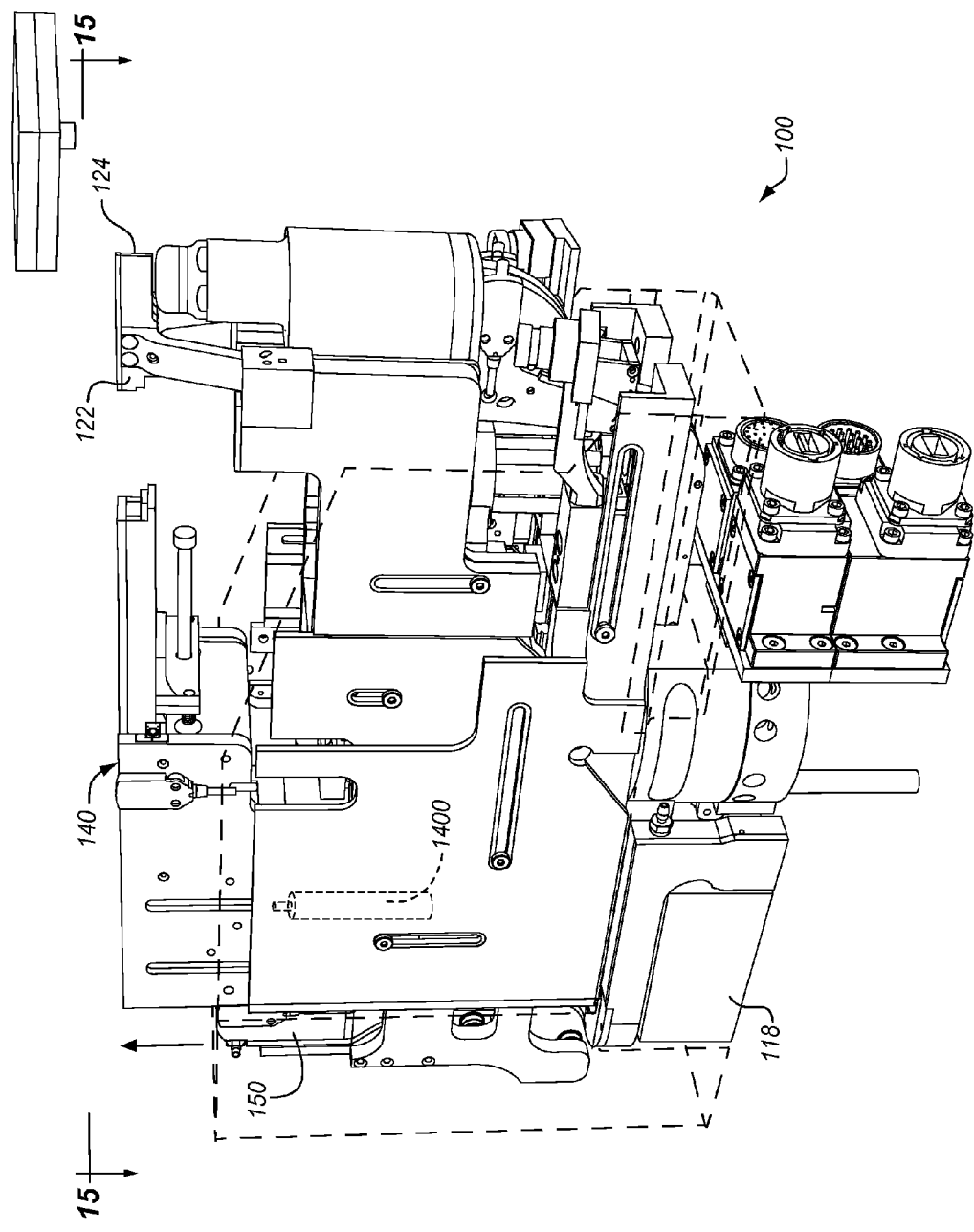

Carriage 140 includes pistons 142 and 144, which define boundaries of a gate 148, and are managed by controller 118 based on sensor input to trap/retain a collar 130 at track 146 while carriage 140 is in motion. For example, break beam sensors (not shown) at each gate (148, 159), along with sensors for each piston (142, 144, 152, 154, etc.) may provide input for controller 118 to control the driving of the pistons (142, 144, 152, 154, etc.). FIG. 13 is a view of swaging system 100, shown in FIG. 11 by the numeral 12. FIG. 13 illustrates that after controller 118 detects that carriage 140 has coupled with feeder 150, it releases air piston 154, allowing airflow 158 along track 156 to drive collar 130 along track 146 to air piston 144, which is fully extended. Once a break-beam sensor (not shown) detects that collar 130 is in position, controller 118 extends piston 142 to retain collar 130 in position 1200 on carriage 140.

Figure 15:
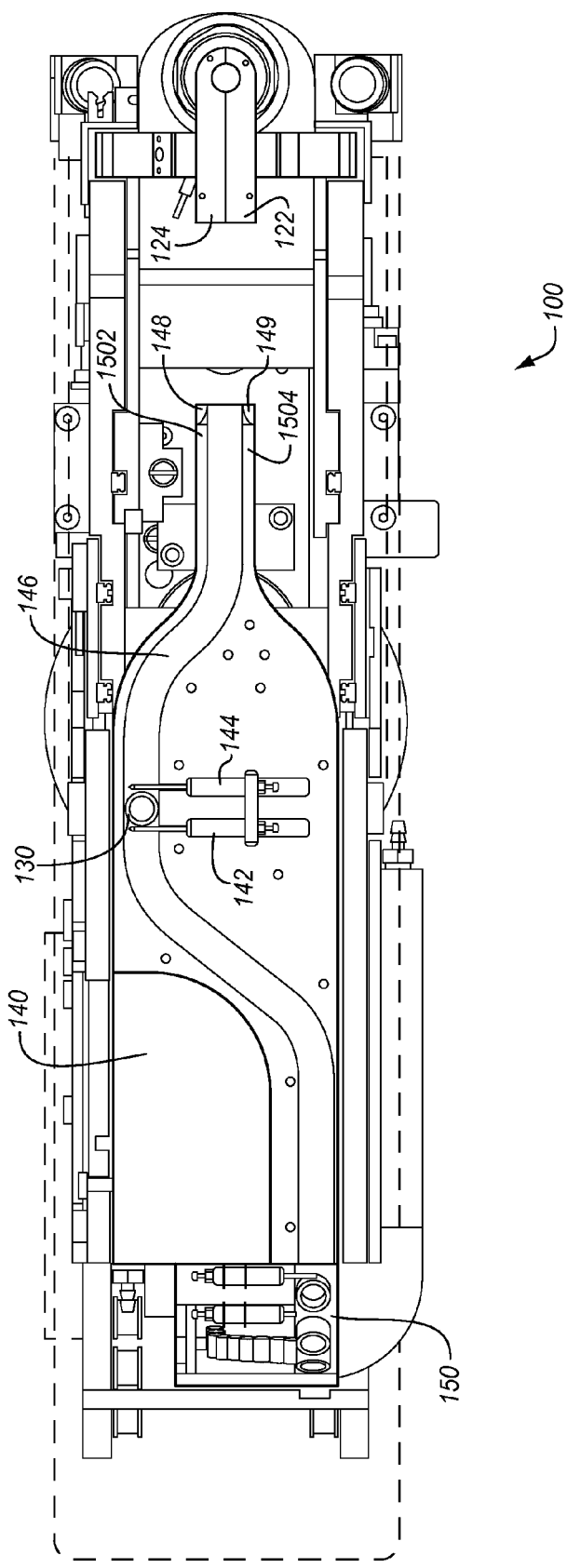

With collar 130 in position, carriage 140 is ready to move towards fingers 122 and 124. Thus, in FIG. 14, controller 118 extends an air piston 1400, located underneath carriage 140, upward to vertically displace carriage 140 upwards until it is substantially coplanar with fingers 122 and 124. FIG. 15 is a view of swaging system 100, shown in FIG. 14 by the numeral 15. FIG. 15 illustrates that while carriage 140 is elevated and not coupled with feeder 150 or the fingers, collar 130 is secured by air pistons 142 and 144 that were shown in FIG. 14. FIG. 15 also illustrates that carriage 140 includes wedges/prongs 148 and 149, which are proximate/adjacent to the sidewalls (1502, 1504) of track 146, and force fingers 122 and 124 outward from a fully mated configuration into a partially open configuration when carriage 140 couples with fingers 122 and 124.

Figure 16:
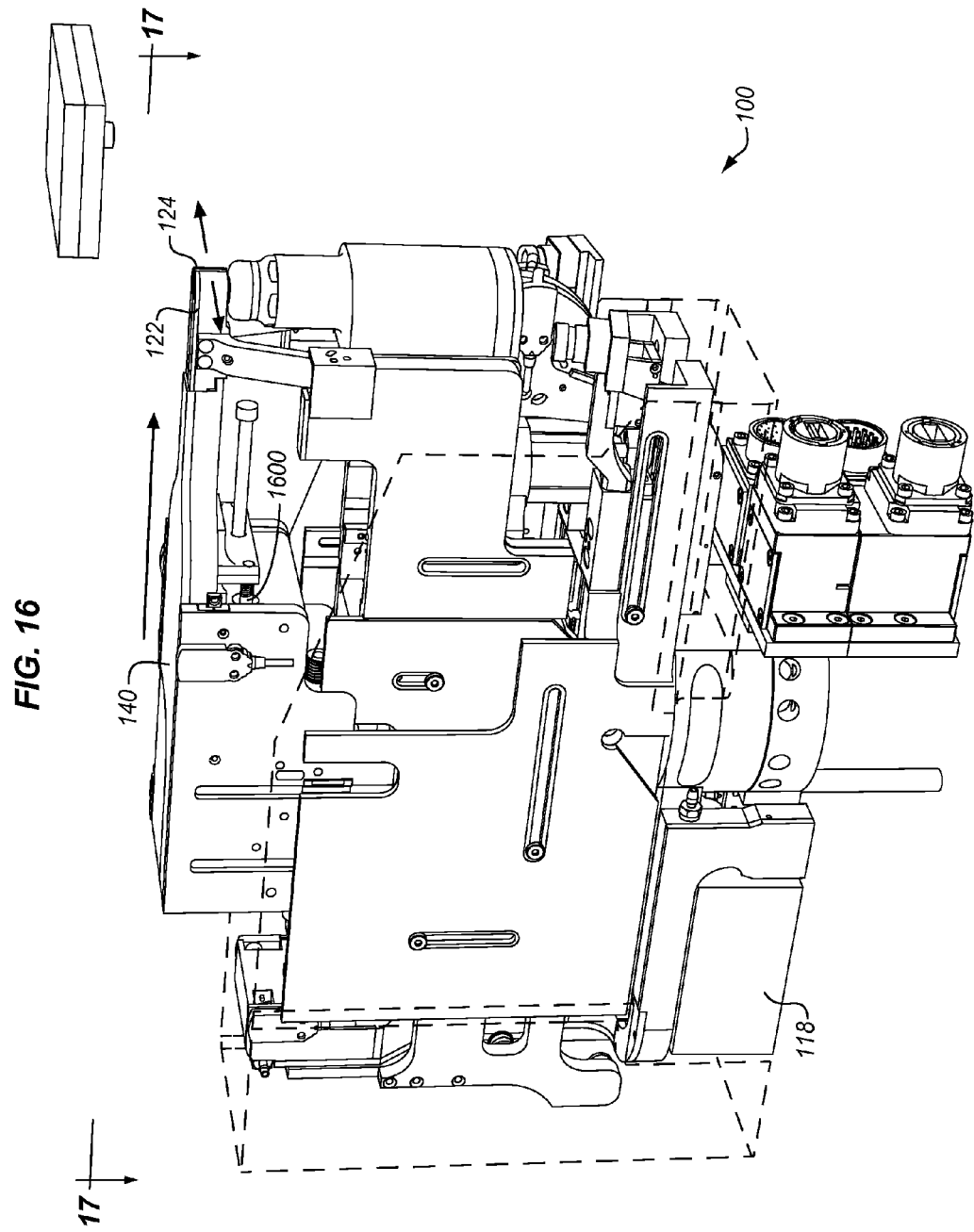
Figure 17:
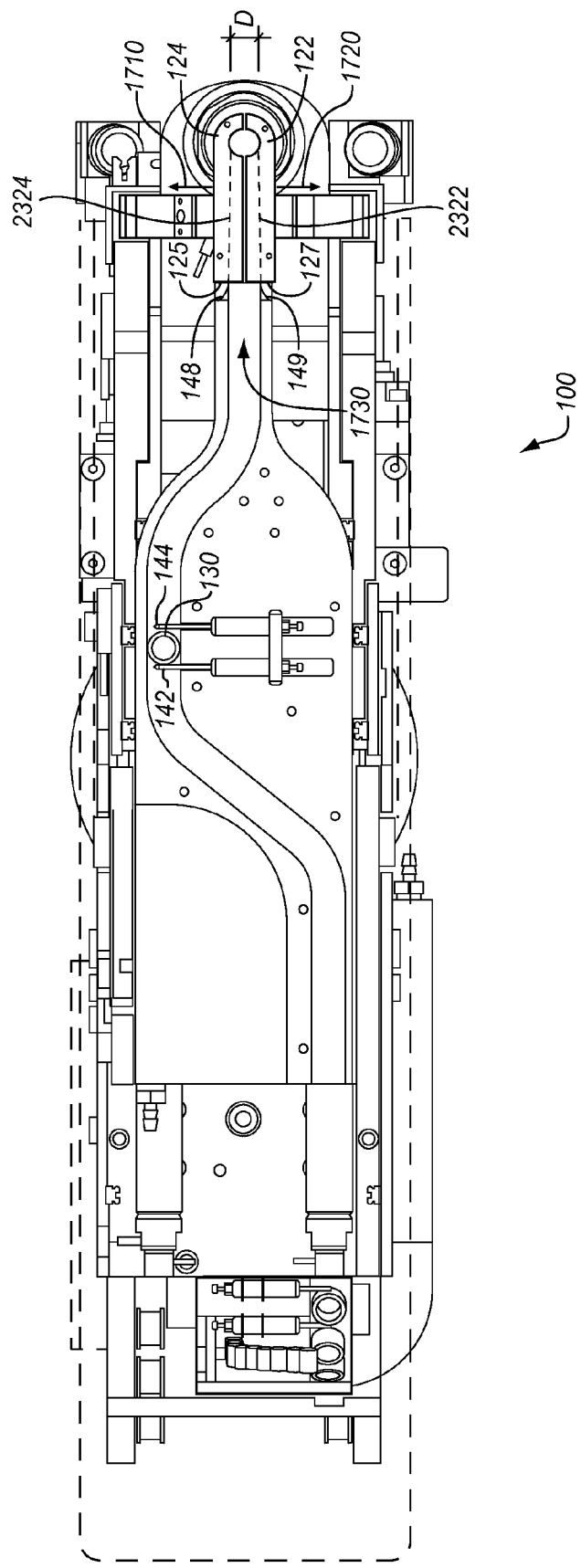

In FIG. 16, controller 118 extends air piston 1600 outward, pressing carriage 140 into fingers 122 and 124. FIG. 17 is a top view of swaging system 100, shown in FIG. 16 by the numeral 17. FIG. 17 illustrates a top view of carriage 140 pressed against fingers 122-124. Wedges 148-148 in carriage 140 have pressed receiving ends (125, 127) of the fingers 122-124 outward from each other (as shown by arrows 1710, 1720), meaning that internal channels (2322, 2324) of the fingers 122-124 (shown by the dashed lines) are sufficiently far apart that they form a hollow tunnel 1730 with a narrowest width (D) equal to a diameter of collar 130. This means, while the fingers 122-124 are partially apart in this manner (as shown by arrows 1710 and 1720) and still engaged with carriage 140, tunnel 1730 defined by fingers 122-124 may receive collar 130 and deliver collar 130 into a receptacle 131 formed by fingers 122 and 124.

Figure 18:
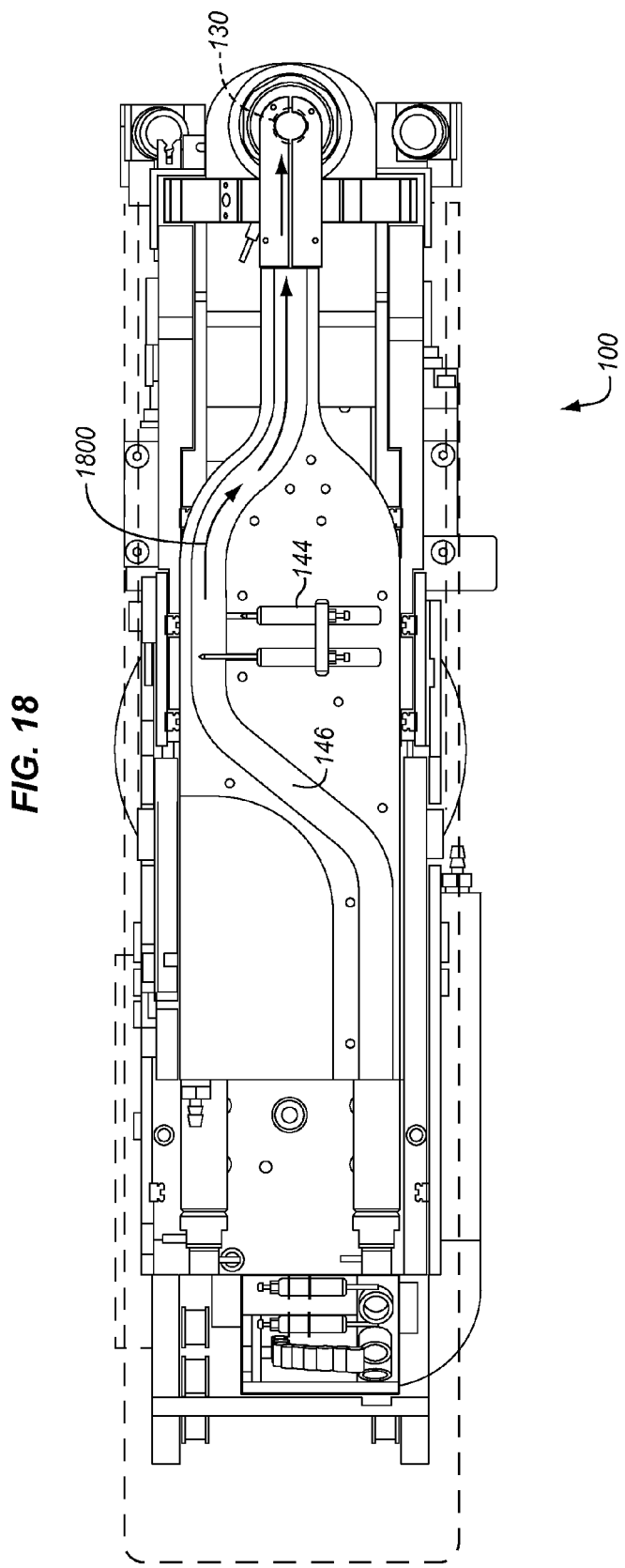
Figure 19:
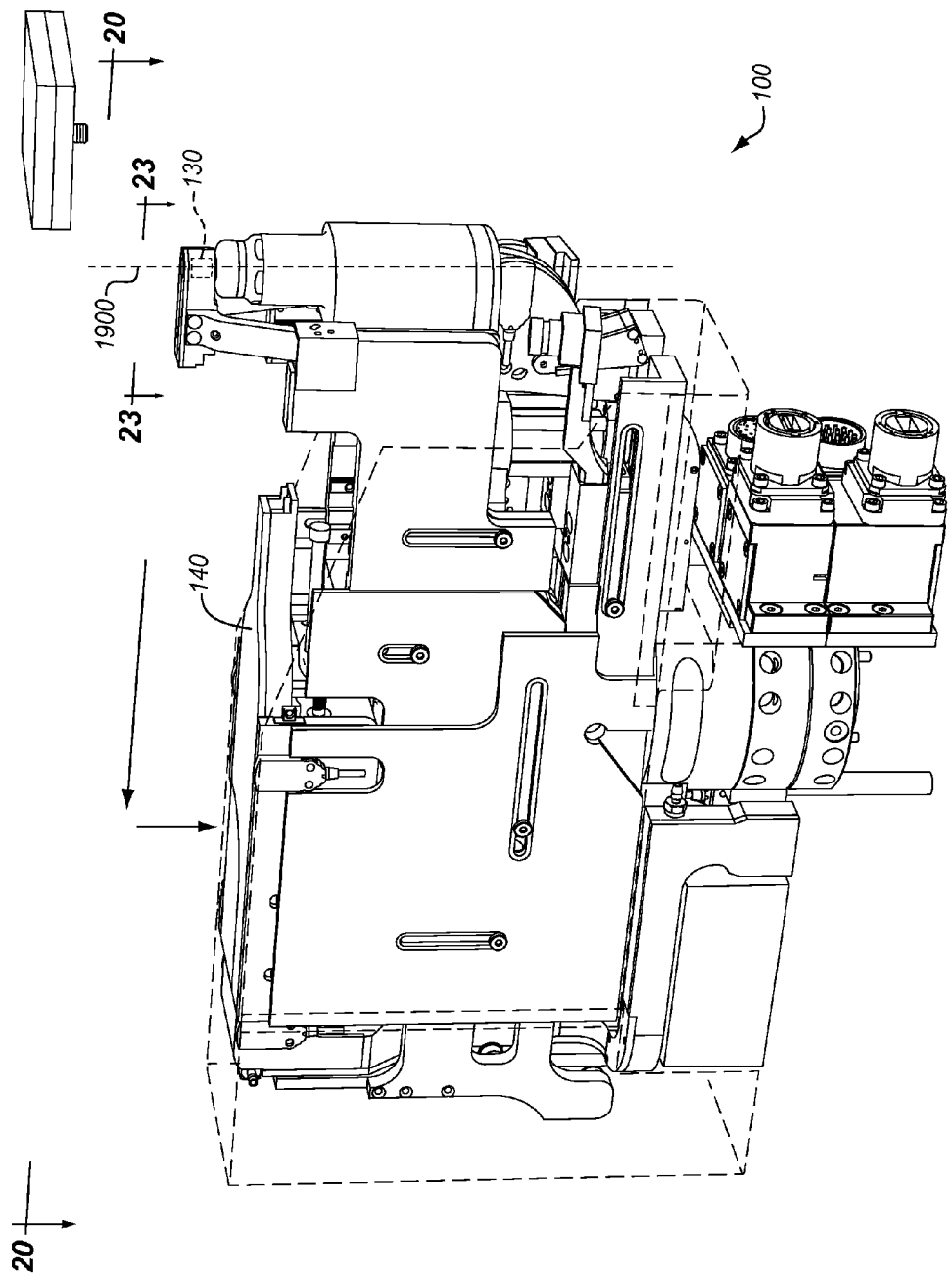
Figure 20:
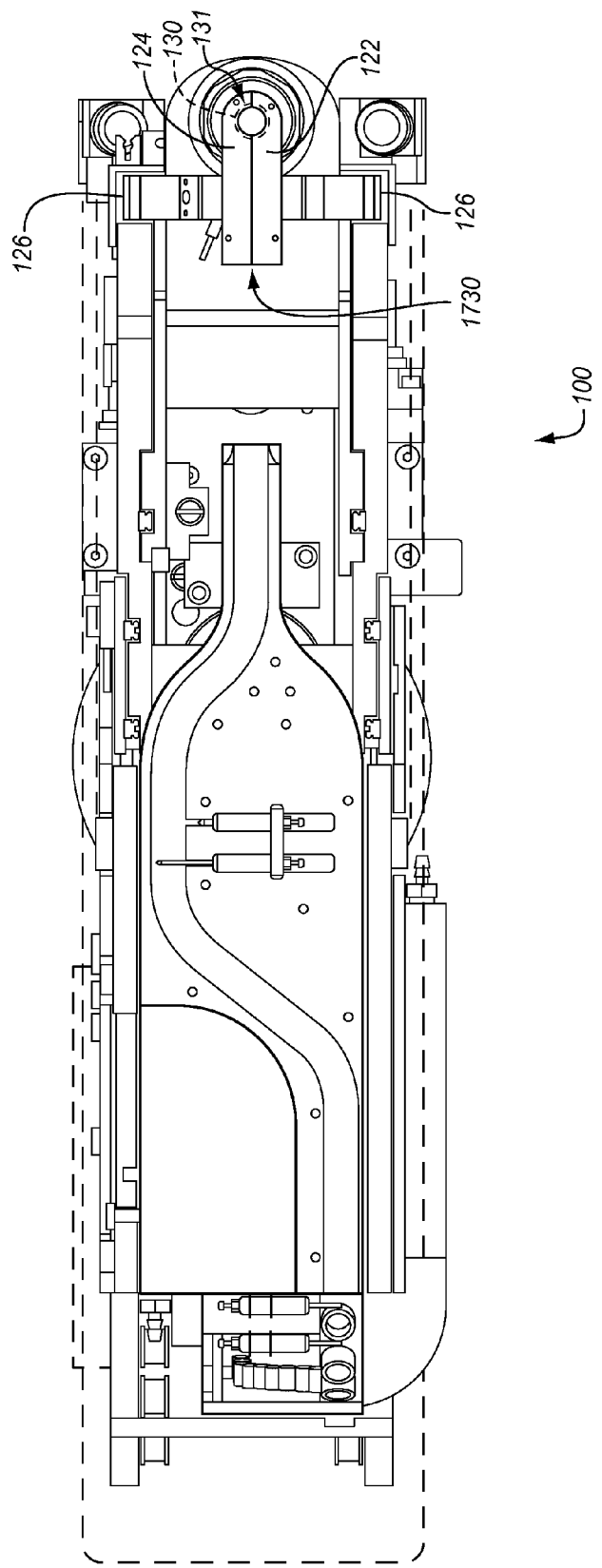

FIG. 18 is also a top view of swaging system 100, shown in FIG. 16 by the numeral 17. To deliver collar 130, controller 118 retracts air piston 144, and drives airflow 1800 along track 146 to move collar 130 between fingers 122 and 124 as shown in FIG. 18. After the collar 130 has been delivered, carriage 140 retracts as shown in FIGS. 19-20. FIG. 20 is a view of swaging system 100, shown in FIG. 19 by the numeral 20. In this position as shown in FIG. 20, collar 130 occupies receptacle 131 defined by the fingers 122-124, and exists in alignment with a vertical axis 1900 (FIG. 19) of swage gun 110. With wedges 148-149 withdrawn, tension from tensioners 126 causes fingers 122-124 to mate together again, reducing the width of tunnel 1730 formed by fingers 122-124, such that the new width of tunnel 1730 is less than the diameter of a collar (D). This ensures that a collar 130 cannot travel back out of the fingers via tunnel 1730. By the time carriage 140 has refracted, controller 118 has managed the air pistons of feeder 150 to ensure that another collar 130 is gated and ready to be loaded into carriage 140.

Figure 21:
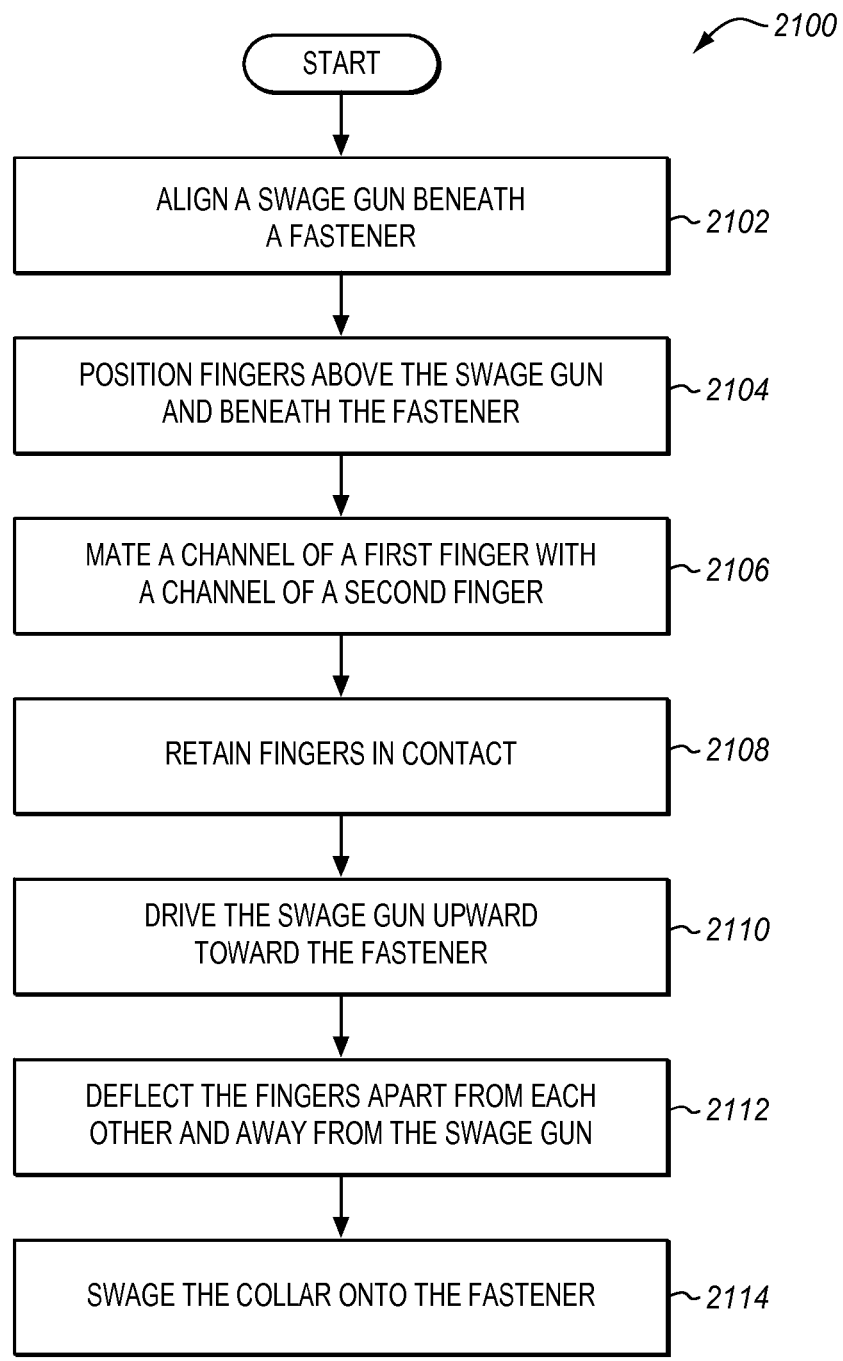
FIG. 21 is a flowchart illustrating a method for operating a swaging system in an exemplary embodiment.

The operations discussed above for swaging are summarized in FIG. 21, which is a flowchart illustrating a method 2100 for operating a swaging system in an exemplary embodiment. For method 2100, in step 2102 controller 118 aligns swage gun 110 beneath fastener 170, based on input from cameras 160 and 162 (step 2102). Fingers 122 and 124 are positioned above swage gun 110, and below fastener 2104 (step 2104). In this position, a channel 2322 of finger 122 is mated with a channel 2324 of finger 124 (as shown in FIG. 17) (step 2106). The fingers are held in contact with each other (e.g., via tensioners) 126 (step 2108). After swage gun 110 is aligned, controller 118 drives swage gun 110 upward toward fastener 170, thereby driving apart fingers 122 and 124 (step 2110). A deflector 600 of swage gun 110 deflects apart fingers 122 and 124 from each other and away from swage gun 110 (step 2112). Controller 118 further operates swage gun 110 to swage collar 130 onto fastener 170 (step 2114), and then lowers swage gun 110 below fastener 170. Carriage 140 has been loaded with a new collar for delivery by feeder 150 at this time. Thus, controller 118 operates the air pistons of swaging system 100 to move carriage 140 to fingers 122 and 124. This causes the wedges on carriage 140 to partially force apart fingers 122 and 124, which in turn causes the fingers to form a hollow tunnel 1730 for collar 130. Then, controller 118 drives collar 130 into receptacle 131 formed by fingers 122 and 124. In this manner, a collar 130 is swaged onto a fastener 170 by swage gun 110, and swage gun 110 is then reloaded.

Figure 22:
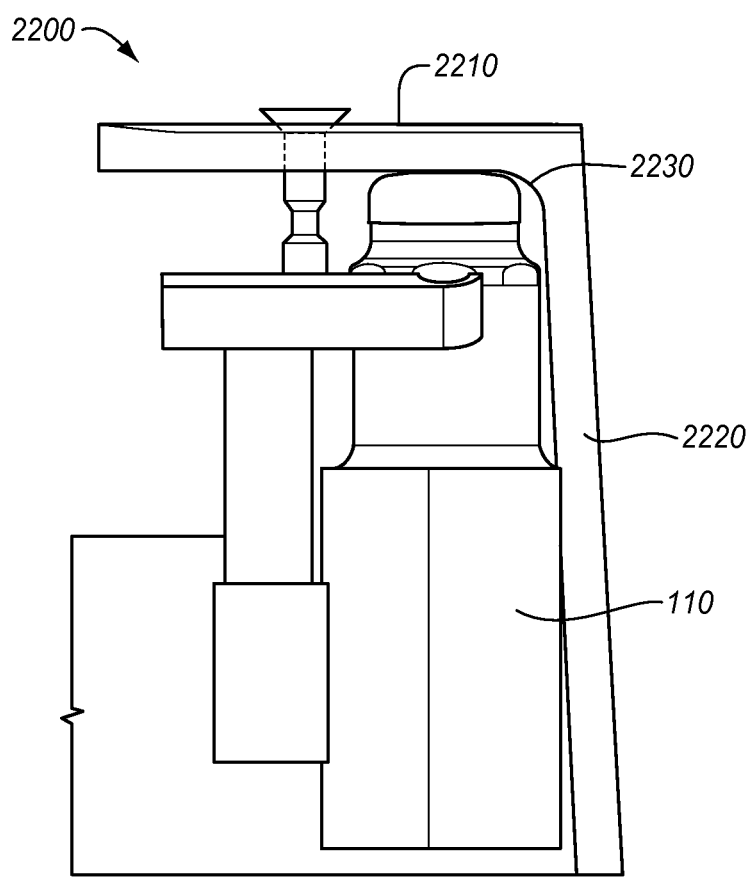
FIG. 22 is a side view of a swaging system operating in a low profile environment in an exemplary embodiment.

Utilizing the techniques described above, the bulk of a collar delivery system 101 for a swage gun is substantially reduced. This enables swaging system 100 to be utilized in low profile environments, increasing the number of locations which may be swage. For example, FIG. 22 is a view of section 320 of FIG. 3, wherein a swage gun 110 operates in a low profile environment 2200 comprising a corner 2230 defined by wall 2220 meeting a ceiling 2210. In this embodiment, swage gun 110 is capable of swaging while flush against an almost ninety degree angle defined by corner 2230. FIG. 22 illustrates one of many exemplary spaces in which swaging system 100 may operate.

Figure 24:
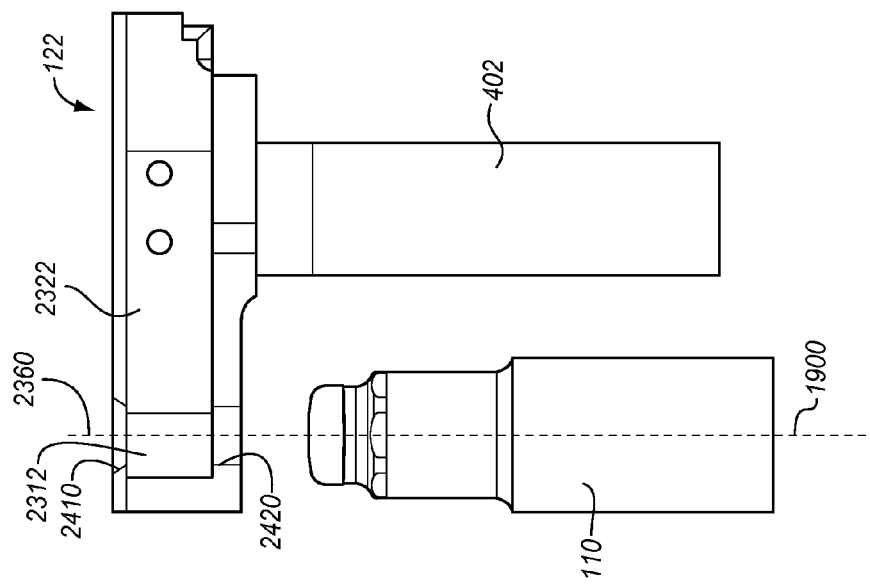
FIGS. 23-24 illustrate zoomed-in views of fingers for a swaging system in an exemplary embodiment.
Figure 23:
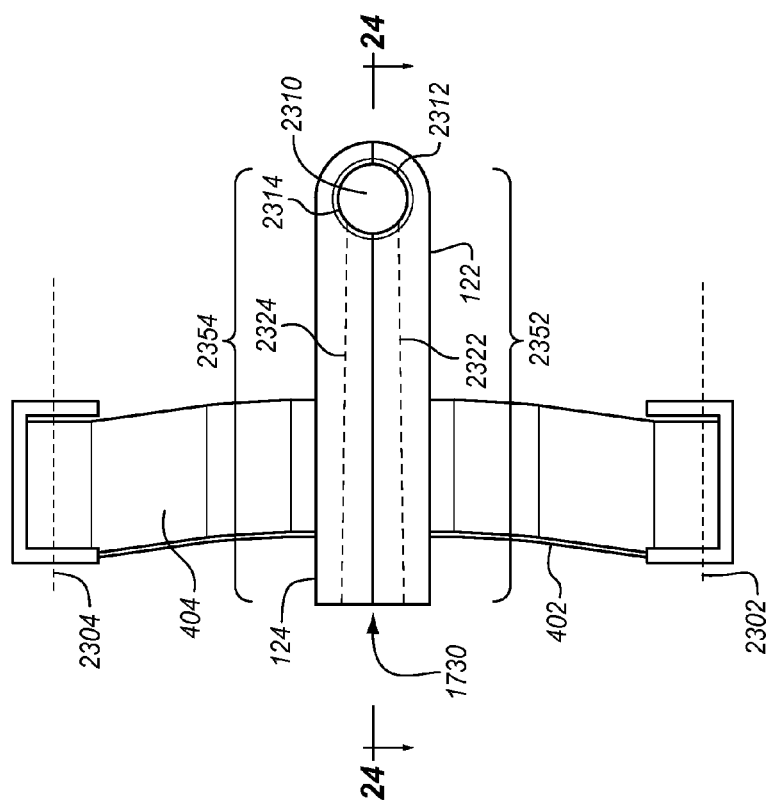

FIGS. 23-24 illustrate top and side views of fingers for a swaging system in an exemplary embodiment as they exist in a closed configuration. FIG. 23 is a top view of fingers 122 and 124, shown in FIG. 19 by the numeral 23. FIG. 24 is a side view of finger 122, shown in FIG. 23 by the numeral 24. These FIGS. further illustrate details of the collar delivery system 101 of FIG. 1, such as pivot axes 2302 and 2304, about which arms 402 and 404 rotate. The FIGS. further illustrate channels 2322 and 2324, which together define a hollow tunnel 1730 for receiving a collar 130. FIGS. 23-24 also clearly show that the lengthwise portions (2352, 2354) of each finger 122-124 include an arcuate portion (2312, 2314), in contact with a channel (2322, 2324. When fingers 122-124 are pressed against each other in contact, the arcuate portions (2312, 2314) combine to form a hollow cylindrical receptacle 2310. The central axis 2360 of the receptacle 2310 is collinear with a vertical axis (1900 of FIG. 19) of swage gun 110 (i.e., an axis traveling vertically upwards through swage gun 110 that is centered). FIG. 24 also illustrates that the arcuate portions (2312, 2314) of fingers 122 and 124 define a small lip above (2410) and a small lip below (2420) the cylindrical receptacle 2310, ensuring that a collar 130 does not unintentionally drop out of the bottom or top of the cylindrical receptacle 2310 before fingers 122, 124 have separated.

Figure 25:
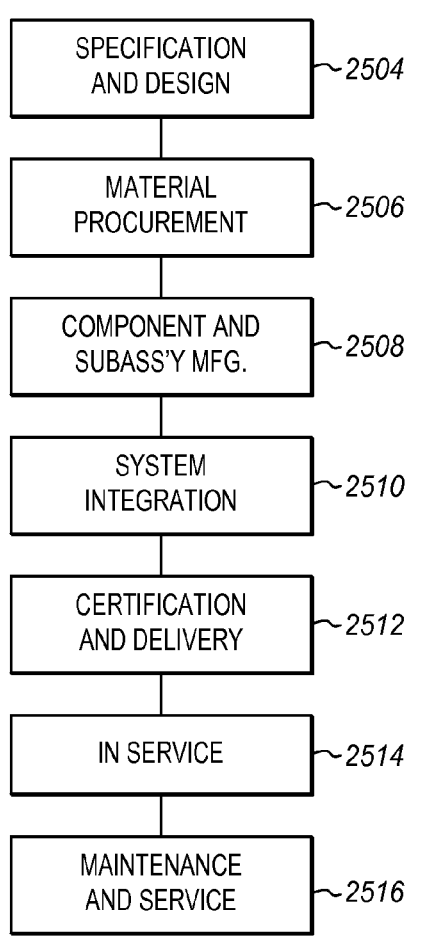
FIGS. 25-26 illustrate exemplary environments for utilizing the systems and methods described herein.
Figure 26:
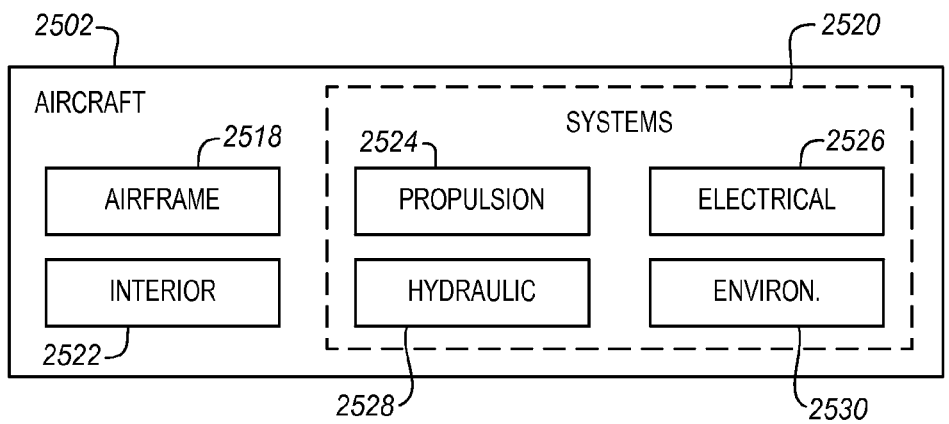

The systems and components described herein may be implemented in the systems described in the following FIGS. 25-26. Referring more particularly to the drawings, embodiments of the disclosure may be described in the context of an aircraft manufacturing and service method 2500 as shown in FIG. 25 and an aircraft 2502 as shown in FIG. 26. During pre-production, exemplary method 2500 may include specification and design 2504 of the aircraft 2502 and material procurement 2506. During production, component and subassembly manufacturing 2508 and system integration 2510 of the aircraft 2502 takes place. Thereafter, the aircraft 2502 may go through certification and delivery 2512 in order to be placed in service 2514. While in service by a customer, the aircraft 2502 is scheduled for routine maintenance and service 2516 (which may also include modification, reconfiguration, refurbishment, and so on).

Each of the processes of method 2500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 26, the aircraft 2502 produced by exemplary method 2500 may include an airframe 2518 with a plurality of systems 2520 and an interior 2522. Examples of high-level systems 2520 include one or more of a propulsion system 2524, an electrical system 2526, a hydraulic system 2526, and an environmental system 2530. Any number of other systems may be included. Although an aerospace example is shown, the principles of the invention may be applied to other industries, such as the automotive industry.

Apparatus and methods embodied herein may be employed during any one or more of the stages of the production and service method 2500. For example, components or subassemblies corresponding to production process 2508 may be fabricated or manufactured in a manner similar to components or subassemblies produced while the aircraft 2502 is in service. Also, one or more apparatus embodiments, method embodiments, or a combination thereof may be utilized during the production stages 2508 and 2510, for example, by substantially expediting assembly of or reducing the cost of an aircraft 2502. Similarly, one or more of apparatus embodiments, method embodiments, or a combination thereof may be utilized while the aircraft 2502 is in service, for example and without limitation, to maintenance and service 2516.

Figure 27:
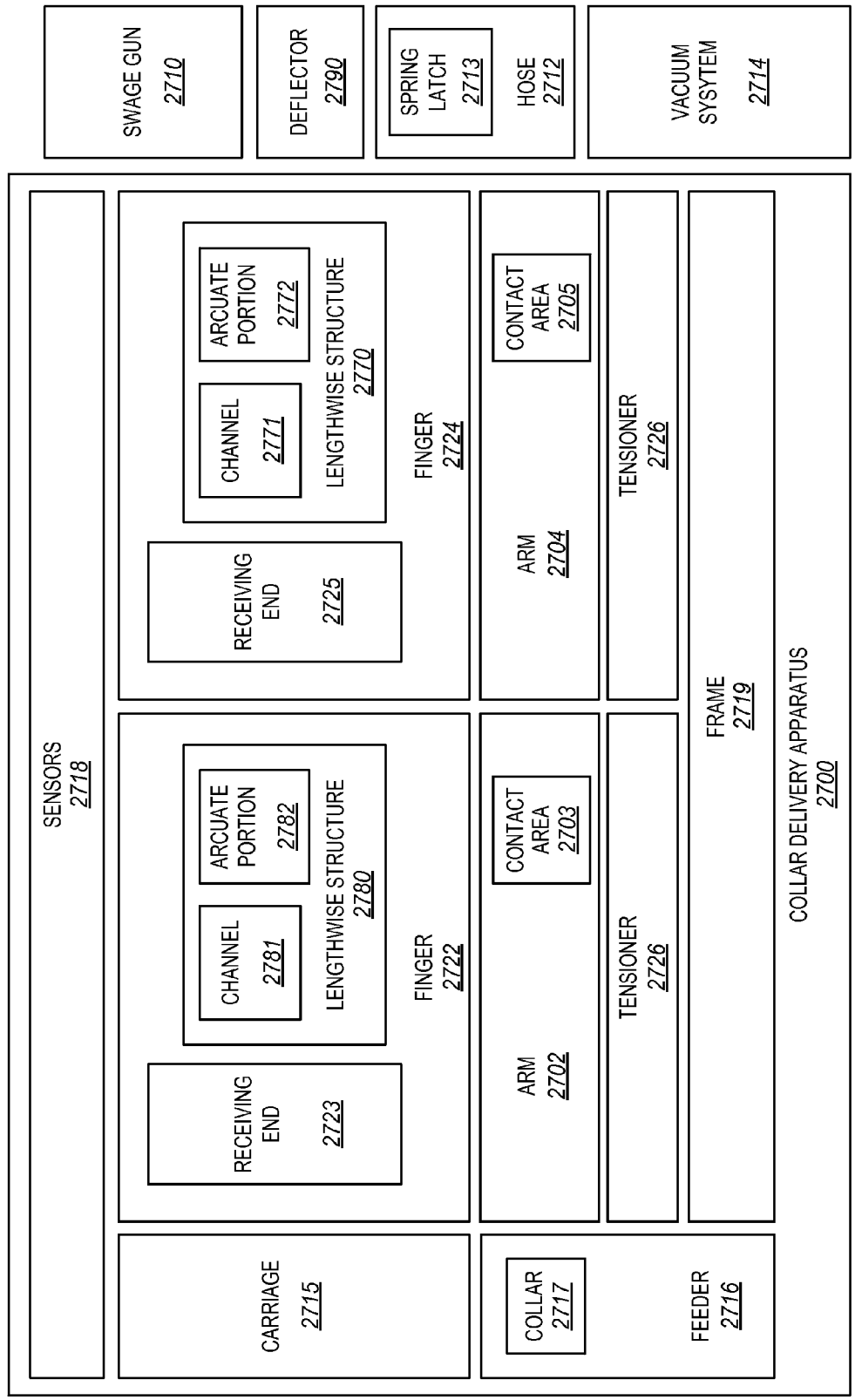
FIG. 27 is a block diagram illustrating components of an exemplary swaging system.

FIG. 27 is a block diagram illustrating elements of a swaging system. Specifically, FIG. 7 illustrates a collar delivery apparatus 2700 that includes a frame 2719, tensioners 2726, arm 2702 and arm 2704, and fingers 2722 and 2724. Arm 2702 includes contact area 2703, and arm 2704 includes contact area 2705. Finger 2722 includes lengthwise structure 2780, channel 2781, arcuate portion 2782, and receiving end 2723. Finger 2724 includes receiving end 2725, lengthwise structure 2770, channel 2771, and arcuate portion 2772. Collar delivery apparatus 2700 includes frame 2714, which supports swage gun 2710 and deflector 2790. A collar 2717 travels from feeder 2716 into carriage 2715, and then into receiving ends 2723 and 2725, through channels 2781 and 2771 until it rests in between arcuate portions 2781 and 2772. The collar 2717 is then swaged by swage gun 2710. A pintail is then broken off by swage gun 2710. The pintail drops through swage gun 2710 into hose 2712, where it is retained by spring latch 2713. When swage gun 2710 returns to a resting position, spring latch 2713 is forced open, causing the pintail to be removed via vacuum system 2714. Break beam sensors 2718 detect the position of collar 2717 and the pintail as they move throughout the system. The sensors 2718 also detect the position of the arms 2702 and 2704 and the swage gun 2710 as the swage gun 2710 moves during operation.

Any of the various controller elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on feeders that are readable by the processor. Some examples of the feeders are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A collar delivery apparatus for a swage gun, the apparatus comprising:
a frame;
arms rotatably attached to the frame;
a tensioner mechanism that applies force to drive the arms towards each other; and
fingers that each extend from a corresponding one of the arms, and that each include a lengthwise structure comprising:
an arcuate portion dimensioned to mate with an arcuate portion of another one of the fingers to form a hollow cylindrical receptacle, and
a channel extending from a receiving end of the finger to the arcuate portion along a direction substantially parallel to a pivot axis of the arm, dimensioned to mate with a channel of another one of the fingers to form a hollow tunnel extending along the direction;

the arms each comprise a contact area contacting a deflector attached to the swage gun, and each of the arms are rotatable about their corresponding pivot axis.

2. The apparatus of claim 1, wherein:
the hollow receptacle is dimensioned to retain a collar when the arms are driven towards each other.

3. The apparatus of claim 1, wherein:
the hollow tunnel is dimensioned to deliver a collar to the receptacle when the fingers are partially apart from each other.

4. The apparatus of claim 1, wherein:
the arms are driven away from each other when force is applied to the contact areas, thereby causing the arcuate portions of the fingers to form the hollow receptacle to retain a collar.

5. The apparatus of claim 1 further comprising:
a carriage comprising:
  a loading track with a gate that retains a collar for delivery to the fingers; and
  wedges that are each proximate to a sidewall of the loading track, and are each dimensioned to engage a receiving end of a channel of a finger to force the fingers partially apart from each other.

6. The apparatus of claim 5 wherein:
the carriage is driven by pistons that engage and disengage the carriage from the fingers.

7. The apparatus of claim 6 wherein:
the gate comprises internal pistons positioned along the loading track that hold a collar while the carriage is in motion.

8. The apparatus of claim 5 wherein:
the carriage, when disengaged from the fingers, is adapted to engage with a feeder to receive an additional collar via the loading track, and
the feeder comprises a gate that retains a collar for delivery to the carriage.

9. The apparatus of claim 5 wherein:
the wedges are separated by a distance equal to a diameter of the collar.

10. The apparatus of claim 1 wherein:
the tensioner mechanism comprises springs that each apply force to rotate a corresponding arm about its pivot axis.

11. The apparatus of claim 10 wherein:
each spring is proximate to a corresponding pivot axis.

12. The apparatus of claim 1 wherein:
a central axis of the receptacle is aligned with a vertical axis of the swage gun.

13. The apparatus of claim 9, wherein:
a central axis of the receptacle is collinear with a vertical axis of the swage gun.

14. The apparatus of claim 1 wherein:
the swage gun breaks off a pintail of a fastener during swaging, and
the apparatus further includes a return hose for the pintail, wherein the return hose is attached to the swage gun.

15. The apparatus of claim 11 wherein:
the return hose comprises an end that mates with a vacuum system for the pintail when the swage gun is retracted, and
when the swage gun is extended, a spring latch on the return hose blocks the end of the return hose to prevent a pintail from dropping out of the return hose.

* * * * *